United States Patent
Heubel et al.

(10) Patent No.: US 10,296,091 B2
(45) Date of Patent: May 21, 2019

(54) CONTEXTUAL PRESSURE SENSING HAPTIC RESPONSES

(71) Applicant: Immersion Corporation, San Jose, CA (US)

(72) Inventors: Robert W. Heubel, San Leandro, CA (US); Danny A. Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/292,814

(22) Filed: Oct. 13, 2016

(65) Prior Publication Data

US 2018/0107276 A1    Apr. 19, 2018

(51) Int. Cl.
| G06F 3/01 | (2006.01) |
| G06F 3/0488 | (2013.01) |
| G06F 3/0481 | (2013.01) |
| G06F 3/0484 | (2013.01) |

(52) U.S. Cl.
CPC .............. *G06F 3/016* (2013.01); *G06F 3/011* (2013.01); *G06F 3/04815* (2013.01); *G06F 3/04842* (2013.01); *G06F 3/04883* (2013.01); *G06F 2203/04104* (2013.01); *G06F 2203/04105* (2013.01)

(58) Field of Classification Search
CPC ................. G06F 3/016; G06F 3/04883; G06F 2203/04104; G06F 2203/04105
See application file for complete search history.

(56) References Cited

U.S. PATENT DOCUMENTS

| 8,432,365 | B2 | 4/2013 | Kim et al. |
| 8,749,507 | B2 | 6/2014 | Dacosta et al. |
| 9,030,428 | B2 | 5/2015 | Fleming |
| 9,244,562 | B1 | 1/2016 | Rosenberg et al. |
| 9,400,581 | B2 | 7/2016 | Bokma et al. |
| 2006/0119586 | A1* | 6/2006 | Grant .............. G06F 3/016 345/173 |
| 2010/0005390 | A1 | 1/2010 | Bong |
| 2012/0274662 | A1* | 11/2012 | Kim ............... G06F 3/0488 345/650 |
| 2014/0055358 | A1* | 2/2014 | Birnbaum ........ G06F 3/016 345/168 |
| 2014/0201666 | A1* | 7/2014 | Bedikian ......... G06F 3/017 715/771 |
| 2014/0362014 | A1 | 12/2014 | Ullrich et al. |
| 2015/0227207 | A1 | 8/2015 | Winter et al. |
| 2015/0309264 | A1 | 10/2015 | Abovitz et al. |

(Continued)

OTHER PUBLICATIONS

European Patent Office. Extended European Search Report dated Mar. 5, 2018. European Patent Application No. 1 718 6872.2.

(Continued)

*Primary Examiner* — Mark Edwards
(74) *Attorney, Agent, or Firm* — Medler Ferro Woodhouse & Mills PLLC

(57) ABSTRACT

A method of generating haptic effects includes detecting an input of pressure applied to a device using a gesture and determining a level associated with the gesture based on the pressure input, as well as determining a selection of an item at the level based on the gesture and a context associated with the item at the level, along with generating a contextual haptic effect comprising haptic parameter based on the context of the item at the level.

18 Claims, 7 Drawing Sheets

(56) References Cited

U.S. PATENT DOCUMENTS

2015/0335293 A1* 11/2015 Christman ........... A61B 5/6897
600/324
2016/0026253 A1 1/2016 Bradski et al.

OTHER PUBLICATIONS

Communication pursuant to Article 94(3) EPC issued in European Application No. 17186872, dated Jan. 30, 2019.

* cited by examiner

CONTEXTUAL PRESSURE SENSING HAPTIC RESPONSES

FIELD

One embodiment is directed generally to haptic effects, and more particularly, to a device that generates haptic effects in response to pressure sensing.

BACKGROUND

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

Devices can be configured to coordinate the output of haptic effects with browsing content on a particular device or the output of other content, such as music, movies, games, or other media, so that the haptic effects are incorporated into the other content. For example, haptic effects may be used to assist with scrolling through a list of related items: a device may provide a user with a list of musical albums or books, the user may utilize gestures such as a finger swipe on a screen to scroll through such a list, and a response, such as a click or pop, may be programmed to coincide with each item as it scrolls across the screen. However, as devices and media continue to advance, a simple click may be insufficient to convey enough information about a particular item within the list.

SUMMARY

One embodiment is a method of generating haptic effects, the method including detecting a pressure input applied to a device using a gesture and determining a level associated with the gesture based on the pressure input, as well as determining a selection of an item at the level based on the gesture and a context associated with the item at the level, along with generating a contextual haptic effect in response to the selection of the item according to haptic effect parameters based on the context of the item at the level.

DETAILED DESCRIPTION

One embodiment is a system that provides contextualized haptic responses to a user interacting with a device using pressure sensing. The device may provide at least one screen that displays choices of, e.g., media. The device may allow the user to scroll through a list of media and provides haptic effects related to items contained within the list and in response to a pressure-related interaction. One embodiment includes a database associating a context with each item in the list. One embodiment generates a haptic effect on the device based on the context associated with an item.

Figure 1:
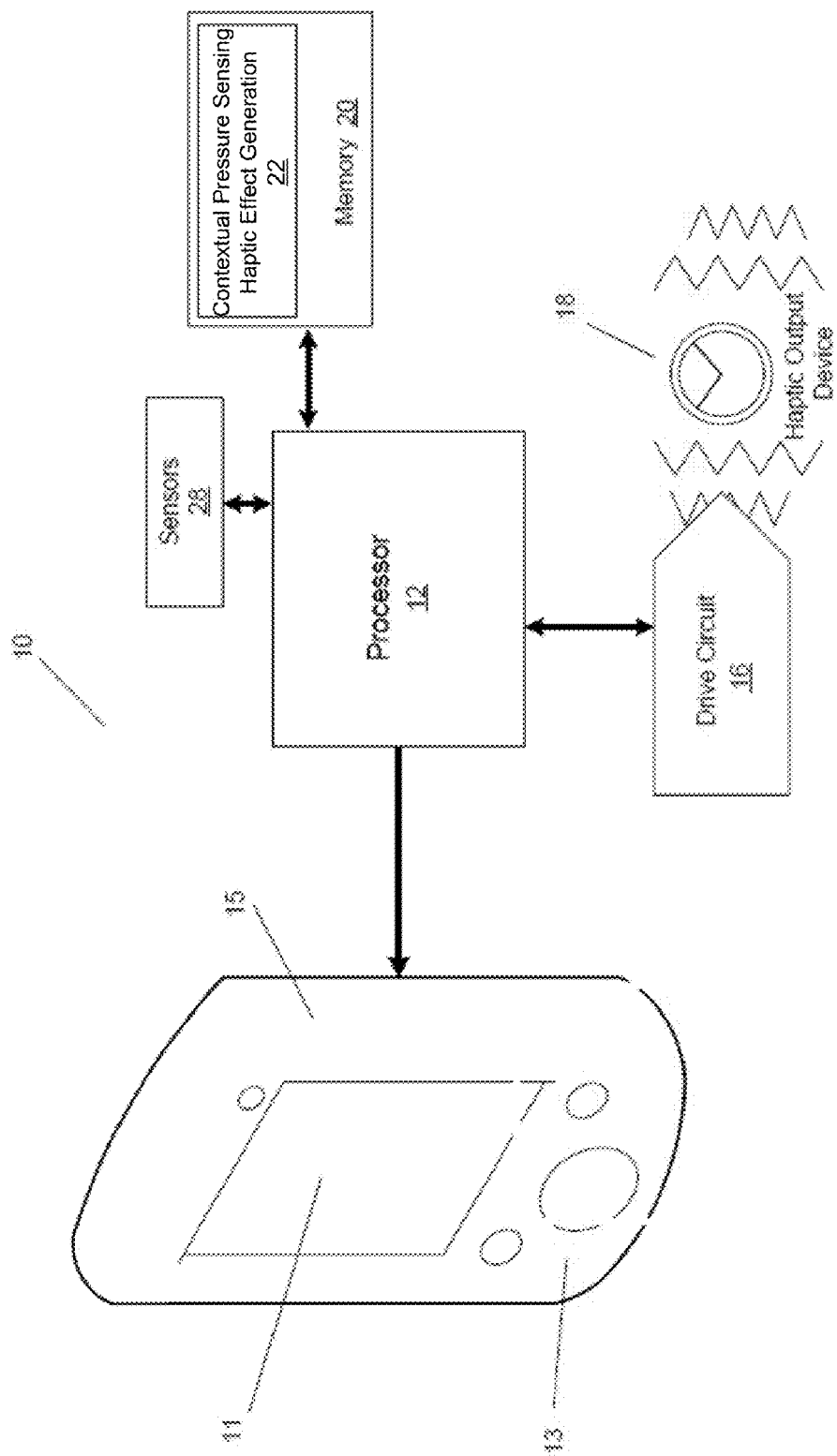
FIG. 1 illustrates a block diagram of a system in accordance with one embodiment of the invention.

FIG. 1 is a block diagram of a haptically-enabled mobile device system or system 10 that can implement an embodiment of the present invention. System 10 includes a touch sensitive surface 11 or other type of user interface mounted within a housing 15, and may include mechanical keys/buttons 13. Internal to system 10 is a haptic feedback system that generates haptic effects on system 10. In one embodiment, the haptic effects are generated on touch surface 11 or on any other part of system 10.

The haptic feedback system includes a processor or controller 12. Coupled to processor 12 is a memory 20 and a drive circuit 16, which is coupled to a haptic output device 18. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to drive circuit 16, which includes electronic components and circuitry used to supply haptic output device 18 with the required electrical current and voltage (i.e., "motor signals") to cause the desired haptic effects to be generated. System 10 may include more than one haptic output device 18, and each haptic output device may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12, such as operating system instructions. Among the instructions, memory 20 includes a contextual pressure sensing haptic effect generation module 22 which contains instructions that, when executed by processor 12, provide contextual haptic effects based on sensed pressure, as disclosed in more detail below. Memory 20 may also be located internal to processor 12, or any combination of internal and external memory. Memory 20 may also be located externally in a cloud-based system.

Haptic output device 18 may be any type of device that generates haptic effects. In one embodiment, haptic output device 18 is an actuator that generates vibratory type haptic effects. Actuators used for this purpose may include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electroactive polymers or shape memory alloys. Haptic output device 18 may also be a device such as an electrostatic friction ("ESF") device or an ultrasonic surface friction ("USF") device, or a device that induces acoustic radiation pressure with an ultrasonic haptic transducer. Other devices can use a haptic substrate and a flexible or deformable surface, and devices can provide projected haptic output such as a puff of air using an air jet, etc.

In embodiments with a touch surface 11, the touchscreen recognizes touches, and may also recognize the position and magnitude of touches on the surface. The data corresponding to the touches is sent to processor 12, or another processor within system 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, buttons, dials, etc., or may be a touchpad with minimal or no images.

Further, in one embodiment, a pressure sensor 14 is configured to detect an amount of pressure exerted by a user against a surface (e.g., touch sensitive surface 11). Pressure sensor 14 is further configured to transmit sensor signals to processor 12. Pressure sensor 14 may include, for example, a capacitive sensor, a strain gauge, a frustrated total internal reflection sensor, or a FSR. In some embodiments, pressure sensor 14 may be configured to determine the surface area of a contact between a user and surface 11.

System 10 may be a handheld device, or mobile device, such a cellular telephone, personal digital assistant ("PDA"), smartphone, computer tablet, gaming console, etc., or may be any other type of device that provides a user interface and includes a haptic effect system that includes one or more actuators. The user interface may be a touch sensitive surface, or can be any other type of user interface such as a physical button, mouse, touchpad, mini-joystick, scroll wheel, trackball, door knob, game pads or game controllers, etc. System 10 may be a flexible/bendable device that generates haptic effects when physically manipulated, in which case the "user interface" is the flexible/bendable portion of the device itself.

Figure 2:
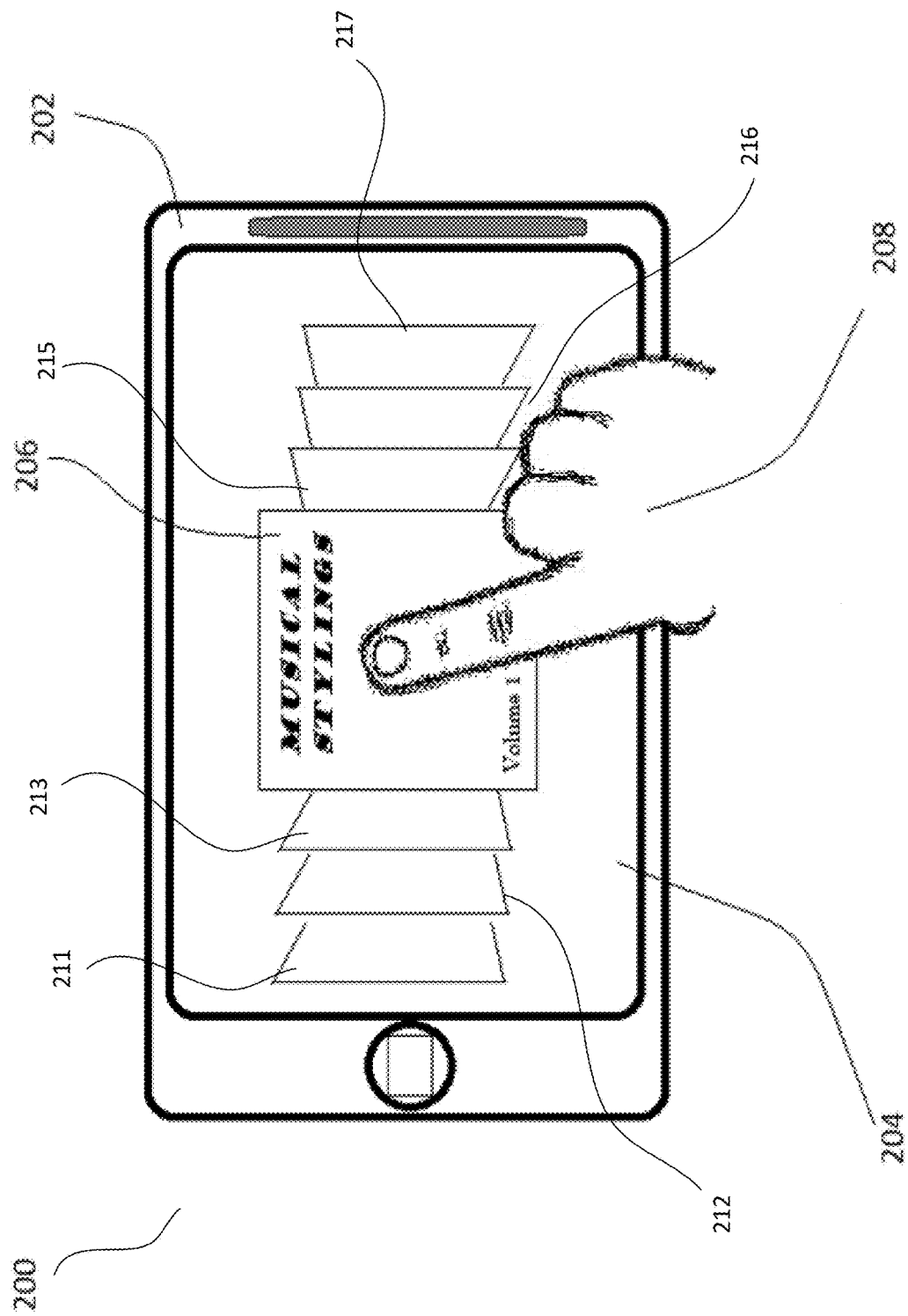
FIG. 2 illustrates an embodiment of a system for pressure-based haptic effects.

FIG. 2 illustrates an embodiment of a system for pressure-based haptic effects. The system 200 includes a computing device 202. In some embodiments, computing device 202 may include a tablet, an e-reader, a car computer (e.g., a computer for controlling one or more automobile systems or devices such as stereo, HVAC, lighting, navigation, or other vehicle functions), a medical device, a laptop computer, a desktop computer, a game system, a portable gaming device, a gamepad, or another electronic device. In other embodiments, computing device 202 may include a multifunction controller, for example, a controller for use in a kiosk, automobile, alarm system, thermostat, or other type of computing device. In the embodiment shown in FIG. 2, computing device 202 includes a mobile phone, such as a smart phone.

In this example, computing device 202 also includes a touchscreen display 204, which combines a touch sensitive surface and display 204. Touchscreen display 204 is outputting a user interface (e.g., a game or music catalogue). In some embodiments, the user interface may include or one or more icons/items or virtual objects 206. In the embodiment shown in FIG. 2, the virtual object 206 includes a virtual media item, such as an album or movie. As illustrated, virtual object 206 is fourth (moving from left to right) amongst a plurality of virtual objects (illustrated as items 211 through 217).

A user 208 may interact with the user interface, for example, by tapping, touching, or gesturing (e.g., a two-finger pinch or a swipe) on touchscreen display 204. In some embodiments, user 208 may interact with the user interface to select or play an album or movie, such as virtual object 206. Touchscreen display 204 is a flat screen that forms a plane with a length and a width, with the length and width representing two dimensions in an x-axis and a y-axis. User 208 may interact with the display 204 by touching display 204 either in a point, a gesture, multiple points, or a mixture. User 208 may also push into display 204, which constitutes a third dimension or depth, along the z-axis of display 204 (i.e., perpendicular or substantially perpendicular to the plane of display 204). As such, user 208 may interact with device 202 in three dimensions.

Figure 3:
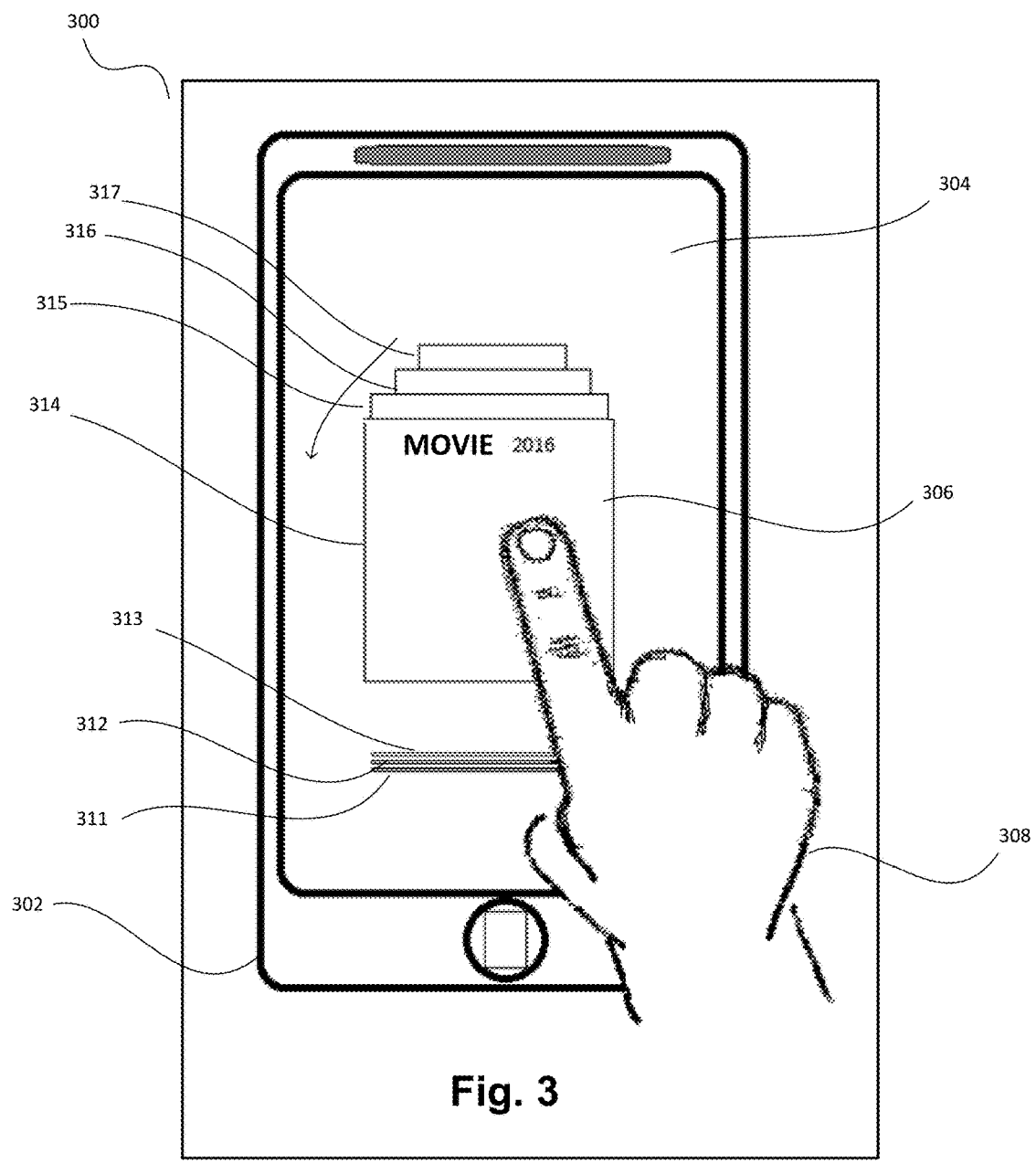
FIG. 3 illustrates an embodiment of a system for pressure-based haptic effects.

FIG. 3 illustrates an embodiment 300 featuring a user interface 304 which includes multiple levels (illustrated as items 311 through 317) with which a user 308 may interact. User 308 may interact with the different interface levels by applying a level of pressure associated with that user interface level. In the alternative, user 308 may feel textures associated with items 311-317 or haptic responses associated with scrolling or browsing through items 311-317 in the user interface by applying soft pressure. In such an embodiment, user 308 may select items by applying a harder amount of pressure. Thus, computing device 302 may provide multiple layers of interaction with an item which may enhance the user experience.

FIG. 3 illustrates an embodiment comprising multiple levels (e.g., in the z-axis perpendicular or substantially perpendicular to the plane formed by user interface 304) which may be accessed by changing an amount of pressure applied to the touch surface. In one embodiment, an increase in pressure applied increases a speed of scrolling or movement in the z-direction, while a decrease in pressure applied decreases a speed of scrolling or movement in the z-direction.

Figure 4:
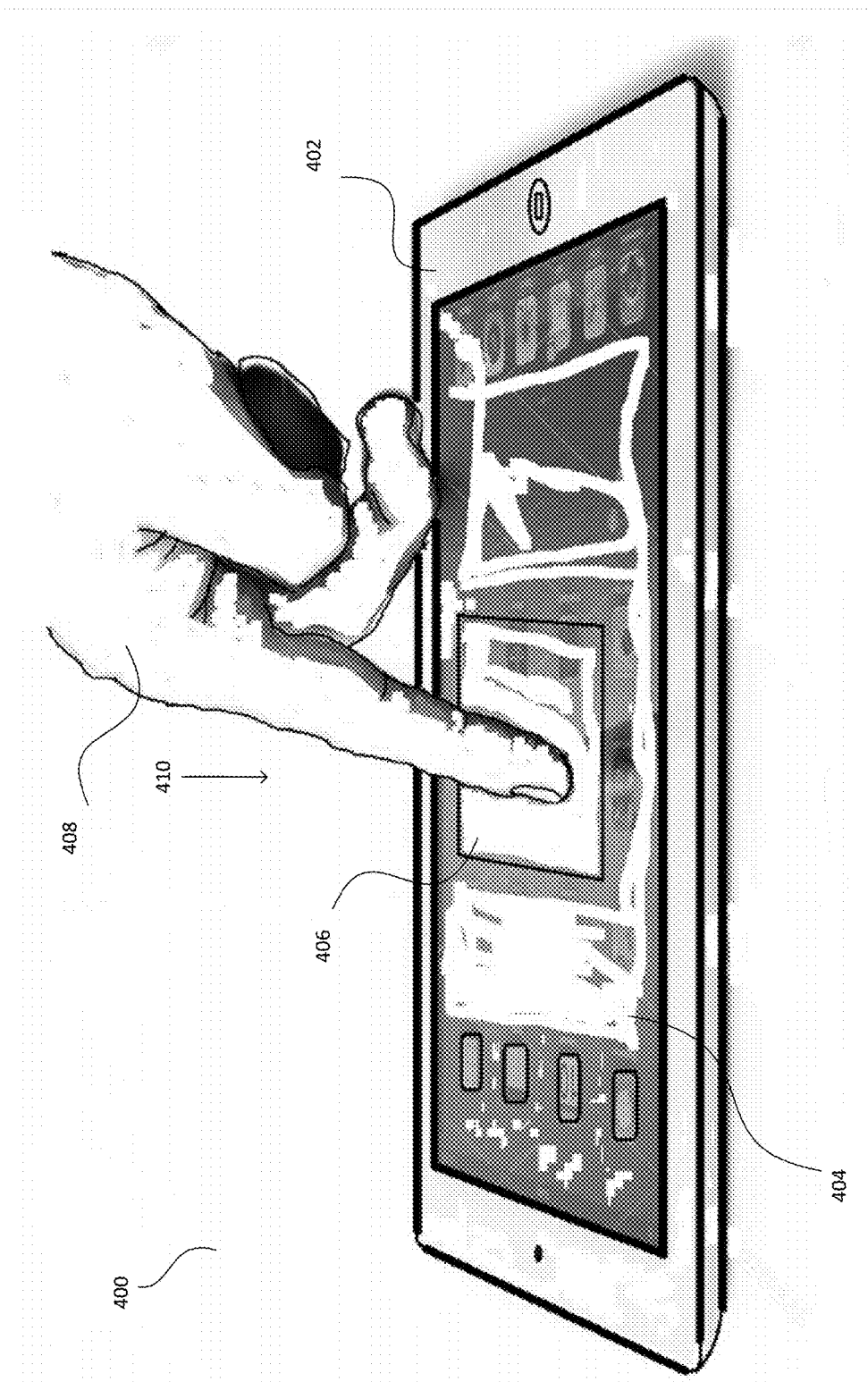
FIG. 4 illustrates a perspective view of an embodiment of a system for pressure-based haptic effects.

FIG. 4 illustrates a perspective view of an embodiment 400 of a haptically-enabled device 402. In FIG. 4, a user 408 presses down on a touchscreen 404, the interaction involving applying pressure into the surface of the device (i.e., in a z-axis perpendicular or substantially perpendicular to touchscreen 404) illustrated as arrow 410. In FIG. 4, user 408 presses down on a particular icon 406 selected from a plurality of available icons using a gesture. The selection of item 406 may result in an enhanced view of item 406, such as an increase in size or brightness. Once selected, continued pressure, either the same, more, or less as to the pressure used to select item 406, may result in providing user 408 with a contextual haptic response for item 406.

Figure 5:
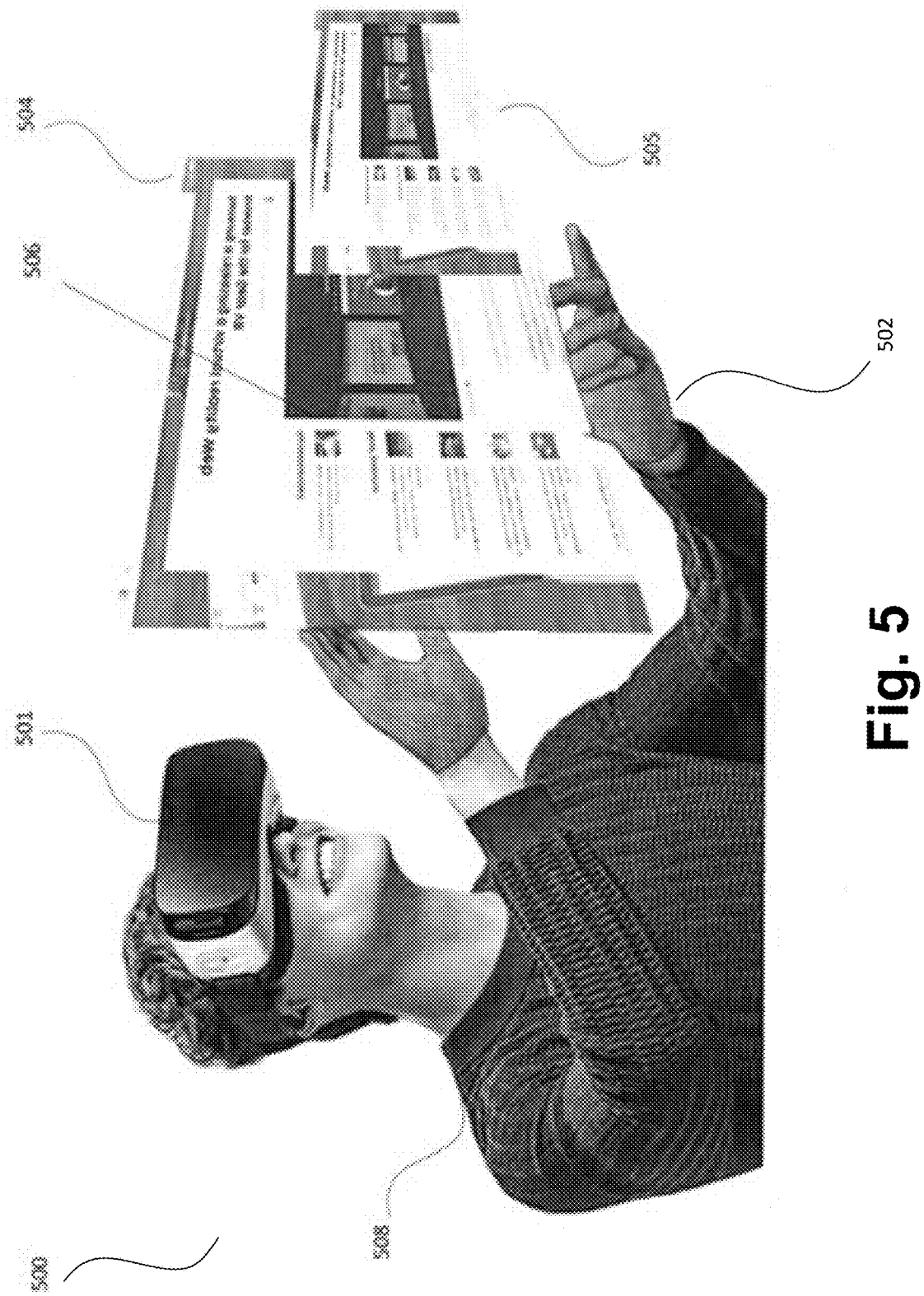
FIG. 5 illustrates a perspective view of an embodiment of a system for pressure-based haptic effects.

FIG. 5 illustrates a perspective view of a user participating in a virtual reality environment in accordance with one embodiment. A user 508 is illustrated using a wearable haptically-enabled device 500, which may include a headgear 501 and peripherals 502, such as gloves. In a virtual environment as illustrated, user 508 may perceive a display or virtual screens 504, 505 (and potentially additional screens/levels). An embodiment includes user 508 applying a virtual pressure using a gesture within the virtual environment which pushes into the virtual screen 504 in a perceived direction which is substantially perpendicular to the virtual screen 504, and further pressure that pushes into the next screen 505 at the next level. The virtual system may involve actual or virtual sensors which monitor the user's movement within the virtual environment as well as interactions with actual and/or virtual objects/items (e.g., item 506) included within the virtual environment. The measured "pressure" in one embodiment is a measure of how much the user's hand travels in the substantially perpendicular direction relative to the virtual screen 504.

As user interfaces become more complicated and user content grows rapidly, there is a growing need for methods of accessing that content more efficiently and with a contextual understanding of the content being accessed. The contextual understanding improves user interface ("UI") interaction confidence.

An embodiment of the system uses dynamic haptic responses to provide contextual tactile responses to a user of a device. In one embodiment, the user interaction with the device is in a third dimension or plane (i.e., a z-axis) of user interactions. In an embodiment, the system uses pressure sensing and/or touch surface coverage methods ("pseudo pressure").

As a user interacts with a display screen on a device, either at a top level, within a level in the z-direction, or after clicking on an icon, the user may scroll left/right or up/down to access a number of items which may be a list of application options or a list of media items listed or displayed on the display screen or nested under the icon. The user may scroll through items one at a time to reach a target item. As each item appears on the screen, the device may generate a haptic effect that the user may detect. A primary haptic effect in the form of a binary (i.e., "on or off") simple haptic interaction may be generated as each item appears on screen. The device may be at least any handheld or wearable device, preferably with a display screen configured to be touched or manipulated by the user. A wearable device may be any device worn by a user which is haptically-enabled. A device may also be appropriate that is configured and designed to be adjacent and in contact with the user during use such that haptic feedback may be detected by the user.

An embodiment includes options that allow the user to have a depth interaction in a third plane (z-axis) in addition to left/right plane (x-axis) and up/down plane (y-axis). The use of a third dimension of interaction, in a depth direction, may provide quicker and/or more complete interface options than were previously available. To sense a user's interest in moving in a depth direction (i.e., the z-axis) an embodiment uses pressure sensing or surface coverage sensing methods; also known as pseudo-pressure. As the user scrolls in a direction, along the x-axis, y-axis, or z-axis, a first tactile response may be provided in the form of a pop or click or other simple interaction that serves as a confirmation and may be a binary (i.e., on or off) response. The first tactile response may be created to coincide with an item, which may be from within a list of a plurality of items, appearing on the display of the device.

In addition to the first tactile response described above, an embodiment includes an additional, secondary tactile response which is provided in the form of a dynamic haptic response based on a context of the item appearing on the display screen. The contextual information is provided to allow the user to better understand the items and better control their interactions with the device and items stored thereupon. In other words, the contextual information provides the user with additional information about the item on the display screen beyond whatever icon is being displayed. The contextual information may complement the image on the display screen or may provide information about an icon independent from the image itself. The contextual information may also be used to communicate information about one or more items related, contained within, or subordinate to the icon or image displayed on the device.

For example, in an embodiment, a user may navigate in a z-axis through a stack of menus, screens, or other content using pressure, such as items 311-317 of FIG. 3. As the user moves through the stack, pressure being applied by the user may cause the device to scroll through the stack of menus. The amount of pressure applied by the user may cause a change in the speed of scrolling and result in an accompanying haptic response, which dynamically changes based on the rate of movement through the stack. For example, as more pressure is applied by the user, the speed of the scrolling may increase. As the speed increases commensurate with the increased pressure, the haptic response provided may change dynamically as well to communicate to the user the speed of scrolling or that there has been a change in the speed of scrolling. In other words, dynamically changing haptic responses may be used to communicate information to the user while the user interacts with the device through applied pressure.

The haptic response may also dynamically change based on the particular item being passed through during the scrolling. For example, as a user is scrolling through a list of items, such as items 311-317 of FIG. 3, a primary haptic response may indicate each new or next item being scrolled over. Based on the pressure or touch or gesture being used, the device may also produce a second or secondary haptic response to communicate contextual information about a particular item being scrolled over or through. For example, if the user was to scroll through a stack of virtual music albums on a device, the user may trigger a haptic confirmation (i.e., a primary haptic response) as the user moves through each album or album layer. The device may additionally or instead provide a second haptic response providing the user with additional contextual information about that album. The contextual information may be system set or user defined. As an example, the system may define one type of haptic effect for cloud-based albums and a different type of haptic effect for albums stored locally on the user device. As another example, a user may have chosen to designate some albums as being favorites and the device provides a different feel associated with favorite albums than a haptic effect associated with albums that have not been identified as favorites.

Additionally, an embodiment may provide contextual haptic effects for an icon arranged on a display screen, even without scrolling. For example, on a device with a main display screen featuring a plurality of regularly accessed icons or programs, systems or user set haptic effects may be used to communicate whether the icon is a communication tool such as a phone or messaging service as opposed to a game or a media player or media file.

Touch Pressure Control Method

One embodiment utilizes a touch pressure control method. One method of moving through a third plane of depth interaction is to use threshold pressure sensing of one or more touch points on a physical touch surface to trigger control responses that assist users with navigating into, through, and out of levels, menus, content screens, messages, photos, links, maps, applications, or other content interactions. Pressure may be detected as a simple touch or touch pressure or may be detected as a force exerted on the touch surface, either at a specific point or location, or may be a force distributed over a detected area of the touch surface. In this embodiment:

P(i) Initial touch pressure+additional pressure P(a)=C(+) increased or positive control action.

Removing P(a) from P(i)=C(−) decreased, negative or return control action.

If P(i) Initial touch pressure+additional pressure P(a) remains constant=continue C(+) increased or positive control action.

For example, a user may apply a first initial pressure P(i) to a display screen and then subsequently apply a different pressure, which may be more or less pressure than P(i). The change in pressure may be used by the system to communicate a command in the form of a positive or negative control action.

An embodiment includes a single z-axis movement into and/or out of levels, menus, content screens, messages, photos, links, maps, apps, or other content interactions. In this embodiment, pressure sensing is used to select a message and/or view the message's contents and includes a simple confirming haptic effect (such as a click), but can also convey that there is an attachment, such as a photo or file to be accessed, by providing a secondary haptic effect, press or change in pressure. The secondary haptic effect provides the context of having an attachment, which the system communicates using a different haptic sensation than the first. The user benefits from knowledge of the presence of the attachment and may be provided the ability to access it.

In another embodiment, pressure sensing is used to select and/or view a photo as well as to provide a simple confirming haptic effect (such as a click) in response to the press action, but also conveys that there are additional details about the photo by providing a secondary haptic effect, the secondary haptic effect being provided additionally due to the selection of the photo or in response to a secondary press or change in pressure. The secondary haptic effect provides the context of the additional photo details, which the system communicates using a different haptic sensation than the first. The user benefits from knowledge of the presence of the photo details and may be provided the ability to access the details.

In another embodiment, using the above pressure interaction to push through a stack of virtual music albums may trigger a haptic effect as confirmation as the user moves through each album layer. But in that confirmation, the type of haptic response provided gives the user additional contextual information about that album that might be system set, or user defined. For example, the system may define one feeling for cloud-based albums and a different feeling for albums stored locally on the user device. Or the user may have defined certain albums as favorites that feel different than non-favorite albums or the user may have set a particular effect to identify a particular genre of music or artist. So, moving into or through one album would give the user contextual information about that album. A change in pressure, such as removing P(a) could result in opening the album song list or commence to play the album. This secondary interaction, the change in pressure, could have the same or a different haptic response as a confirmation of user interaction/system response to user input. A gesture, either alone or in conjunction with a pressure, may also constitute the secondary interaction.

Regarding the previous music album example, a user may scroll or push through a stack of albums, but then wish to navigate through songs for that specific album or navigate through all the albums for a particular artist (e.g., navigation through albums 211-217 of FIG. 2). An embodiment includes using a 2D (x-axis or y axis) finger movement or a motion gesture such as tilting. For each control interaction a confirming haptic response may be triggered to help guide the user. But additionally, as the user navigates through the songs in the album, (or any analogous sublevel) contextual haptic responses may be provided.

In another embodiment, different pressure levels may be associated with different preset responses. For example, accessing specific screens or applications, such as home screens, dialer/texting applications, or another user defined preset response may be triggered by applying a particular pressure or range of pressures. Similar to how many mobile devices have UI buttons that respond differently depending on how long the user keeps the button depressed, or while on a non-home screen or while in an application, the user may press a home screen button to return to the device home screen. Further, keeping the home screen button depressed longer may trigger other interactions, such as accessing the home screen settings menu or in other device applications, or holding down the home screen button might trigger the voice recognition application to launch, and a tactile response confirming the user interaction may be triggered.

Additionally, an embodiment may utilize a gesture made by the user while applying P(i) or the change in pressure to the device to communicate a command.

Touch Surface Area Control Method

Another embodiment includes a method of moving through a third plane of depth interaction (z-axis) by sensing an amount of physical touch surface being covered by one or more touch points to trigger control responses that assist users to navigate into, through and out of levels, menus, content screens, messages, photos, links, maps, apps or other content interactions. In this embodiment:

S(i) Initial surface area+additional surface area S(a)=C(+) increased or positive control action.

Removing S(a) from S(i) results in an opposite C(−) decreased or negative control action.

S1(i)+S2(i)+Sx(i)/x=Averaged touch surface areas+additional surface areas S(a)=(+) increased or positive control action, or S1(i)+S2(i)+Sx(i)=Combined touch surface areas+additional surface areas S(a)=C(+) increased or positive control action.

Removing S(a) from S(i)=C(−) decreased or negative control action.

For example, a user may create contact with a device, the contact including a first initial surface area S(i) to a display screen and then subsequently create contact using a different amount of surface area, which may be more or less surface area than S(i). The change in surface area may be used by the system to communicate a command in the form of a positive or negative control action. In an embodiment, surface area may be calculated as an average surface area by summing S1(i)+S2(i)+Sx(i), where x is the number of discrete surface areas measured and Sx(i) is the last in a series of surface areas, and dividing the sum by x.

Like the threshold pressure music album example, the surface coverage method could be substituted with the same gesture sensing considerations with the same contextual haptic response considerations, giving the user more information about the content the user is interacting with in the z-axis.

Virtual Surface Control Method

Another embodiment includes a method involving a projected interface with a virtual surface such as in a virtual or augmented reality system. For example, the projected interface (e.g., interfaces 504, 505 of FIG. 5) appears to hang in space with no physical touch surface. The method of a virtual surface control method involves tracking movement through a third plane of depth which requires sensing a distance traveled by one or more touch points and may trigger additional control responses that assist users with navigating into, through, and out of levels, menus, content screens, messages, photos, links, maps, apps or other content interactions. The virtual surface may be virtually planar, curved, spherical, or another shape. The method of a virtual surface control method may track virtual pressure, measured by a force exerted or distance traveled in virtual space, or virtual pseudo pressure, measured by a virtual touch surface coverage. In this embodiment:

D(i) Initial touch point location+additional distance D(a) =C(+) increased or positive control action.

Removing D(a) from D(i) results in an opposite C(−) decreased or negative control action.

In this control method, a user creates an initial touch point D(i) by interacting with the virtual surface within the virtual or augmented reality system. Initial touch point location D(i) may be a set of coordinates in space that correspond to a point on the virtual surface in virtual or augmented reality. The user may then utilize a movement relative to the virtual surface that corresponds to additional distance D(a) relative to the initial touch point location D(i). The additional distance D(a) may be created by a movement within the virtual space along the virtual surface, into the virtual surface, or away from the virtual surface. Generally, if the additional distance D(a) corresponds with a movement into the virtual surface, the system may recognize a C(+), an increased or positive control action. If the additional distance D(a) is instead a movement out of or away from the virtual surface (for example if initial touch point location is within or deep to a virtual surface), the system may instead recognize a C(−), a decreased or negative control action. Depending on the particular virtual or augmented system, movements along the virtual surface may also be interpreted to create a C(+) or C(−), depending on directionality relative to virtual or augmented reality objects and/or surfaces.

In one gesture sensing scenario involving a virtual surface, position and motor sensors may track the user's input gesture and coordinates in virtual space. When the user's input gesture coordinates come in contact with the coordinates of the virtual surface, a determination is made if the input gesture has passed one or more virtual input pressure or pseudo pressure thresholds that would result in the generation of input responses from the system, which may be in the form of haptic feedback.

For setting the initial touch point location, an interaction with the virtual surface may be accomplished by a virtual object based on a real world object, such as a finger or hand of the user, or a virtual object only existing in the virtual or augmented reality, such as a virtual sword, virtual magic wand, or other virtual object that may be virtually held or connected to the user virtually during immersion in the virtual world created by the system.

Like the music album example discussed from the touch pressure control method and touch surface control method, the virtual surface control embodiment may be implemented with the same gesture sensing considerations described above, providing the same or different contextual haptic response considerations, in particular, providing giving the user information about items and interactions as the user moves along the z-axis or other axis substantially perpendicular to a virtual surface.

Multiple Touch Point Control Method

Another embodiment includes moving through a third plane of depth interaction by sensing a number of touch points on a physical or virtual touch surface to trigger control responses that assist users with navigating into, through, and out of levels, menus, content screens, messages, photos, links, maps, apps or other content interactions. For example, in an embodiment, using one sensed point moves a user deeper into a screen, menu, or list while using two sensed points moves the user backwards out of that screen, menu, or list depth. This method of multiple touch point control may control interactions independent of or in addition to any pressure or surface area coverage sensing. In this embodiment, the number of sensed touch points dictates control interactions. Like the threshold pressure music album example, the multiple touch point method may be implemented with the same gesture sensing considerations described above, providing the same or different haptic response considerations, in particular, providing the user with information about items and interactions as the user moves along the z-axis.

The systems and methods described herein may be applied to any haptically-enabled user interface device; physical or virtual, touch screen or touch surface.

In embodiments featuring virtual objects and virtual screens, such as in FIG. 5, a haptic response may be generated by a wearable component or as a "projected haptic response." Examples of projected haptic responses are projected pulses of air and low frequency sound waves.

Sensed control embodiments are not limited to a single user or single location. Each method may be utilized for one or more simultaneous users, collocated or remotely located from each other. For example, a user may use any of the embodiments to control depth movement while additional users might be able to stop or alter that control through their own simultaneous input. As an example, a first user may be moving down through the z-axis into screen content, menus, lists, etc. while a second user might use their sensed input to stop or alter the depth control of the first user when they see, hear, or feel content they want to select, discuss, or review more fully with the first user. Gestures may be combined with the control methods to allow additional interaction controls. Gestures may involve 2D hand gestures, such as pinching, twisting, stretching, or dragging gestures or may involve additional hardware components, such as sensing through accelerometers, gyroscopes, eye-tracking, or the like. Movement and haptic feedback may be controlled through the use of gestures which communicate through speed of movement, distance of movement, angle of movement, surface area, pressure (real or virtual), or the like.

Figure 6:
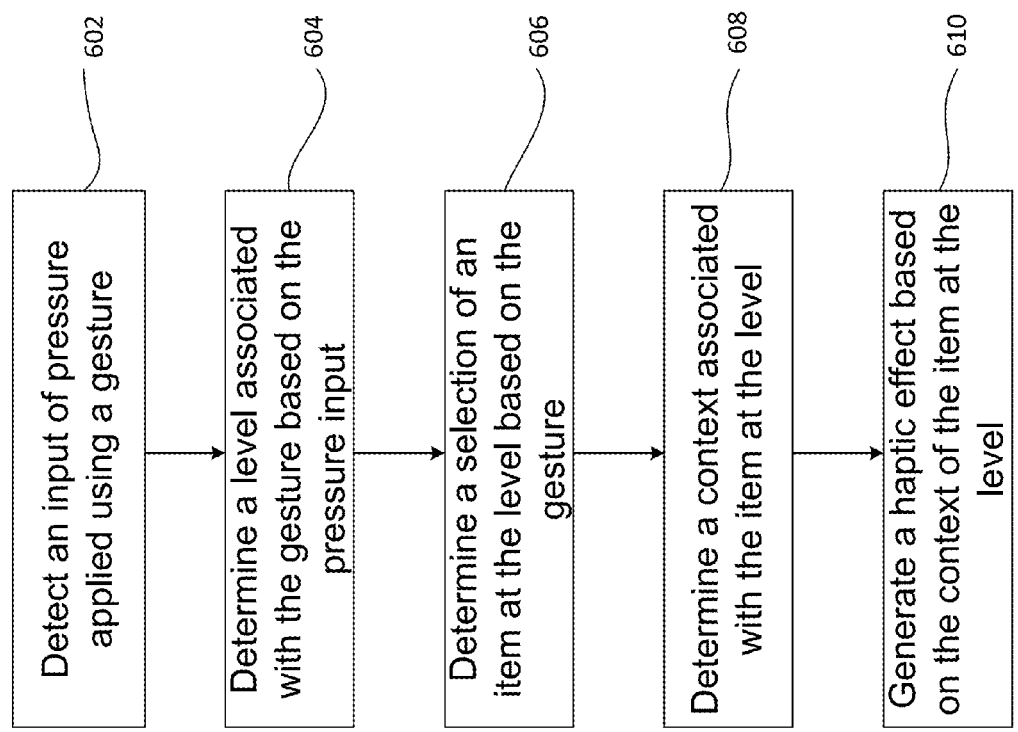
FIG. 6 is a flow diagram of a system in accordance with one embodiment of the invention.

FIG. 6 is a flow diagram of an example of the functionality of system 10 of FIG. 1 when generating a pressure-based haptic effect based on a context associated with a particular item available on system 10 in accordance with an embodiment. In one embodiment, the functionality of the flow diagram of FIG. 6 (and FIG. 7 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 602, system 10 detects an input of pressure applied using a gesture (i.e., an action by the user that indicates that contact with system 10 will or should occur). The gesture can include touches to a touchscreen as well as actions against physical controls such as buttons, triggers, and sliders. The gesture can also include changes in ongoing gestures, such as predicting when a user will interrupt a sliding gesture and lift off the screen. A gesture may also include changes in grip, which may be related to other input mechanisms such as bending, twisting or squeezing a flexible device. Contact or input may be in the form of at least a force, a pressure, a gesture, or an amount of surface area, or a combination. The touchscreen may be an actual two-dimensional surface or may be a virtual screen provided within an augmented reality or virtual reality system.

At 604, the system determines a level associated with the gesture based on the pressure input. The level may be a level within a hierarchy or a place within a list or stack (e.g., levels 311-317 of FIG. 3 or levels 504-505 of FIG. 5). For example, a user may wish to scroll through a list which moves in a horizontal, vertical, or depth plane relative to a display of a device (along a z-axis substantially perpendicular to the touch surface). The pressure input may be actual pressure, a measure of touch surface area ("pseudo pressure"), or a distance traveled through virtual space ("virtual pressure"). In other words, an input of pressure may be based on a force applied with the gesture, a measured touch surface area associated with the gesture, or a distance moved through virtual space by the gesture.

At 606, the system determines a selection of an item/icon/object at the selected level based on the gesture. A user may select an item using a pressure level, a change in pressure applied, a specific gesture or gestures, or a combination thereof. Pressure and gestures may be applied using a single input, such as a finger, or multiple inputs, such as multiple fingers.

At 608, the system determines a context associated with the item at the level. The context may be stored on a contextual database which may be located on a particular device or may be stored remotely and be accessible to the device.

At 610, the system generates a haptic effect based on the context of the item at the level. The appropriate haptic effect is generated based on the input and the context of the item selected by the user. A haptic database may send a haptic effect signal to a haptic output device, which in turn generates the haptic effect.

Figure 7:
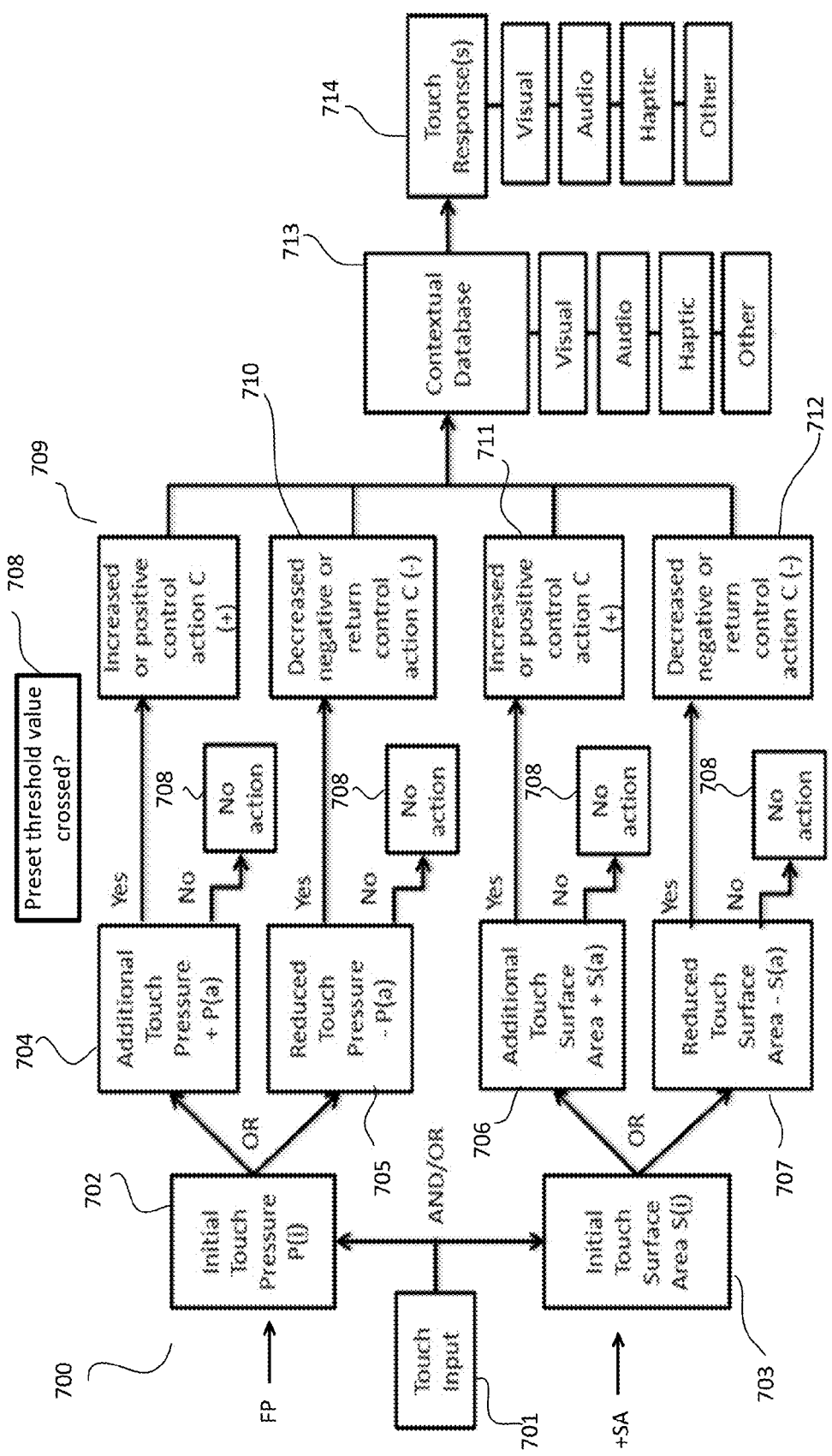
FIG. 7 is a flow diagram of a system in accordance with one embodiment of the invention.

FIG. 7 is a flow diagram illustrating an embodiment of the functionality of system 10 of FIG. 1. At 701, system 10 recognizes a touch input by a user of the system 10. System 10 may associate an item on a device with the location or the touch or an item currently displayed on a screen on the device when the touch is made. System 10 may respond in view of an initial touch pressure P(i) 702 or an initial touch surface area S(i) 703. System 10 may recognize a change in either touch pressure, coming in the form of additional touch pressure (+)P(a) 704 or reduced touch pressure (−)P(a) 705, or surface area, coming in the form of additional touch surface area (+)S(a) 706 or reduced touch surface area (−)S(a) 707. System 10 then determines whether a preset threshold value has been crossed at 708. If the preset threshold value has not been crossed, system 10 takes no action. However, in the event that the preset threshold value has been crossed, system 10 categorizes the change in touch pressure or surface area as an increased or positive control action C(+) at 709, 711 or a decreased, negative, or return control action C(−) at 710, 712. After system 10 characterizes the touch input detected, the system 700 may then access a contextual database at 713, the contextual database providing a context for the item being touched or displayed at 701. The contextual database may be located on a particular device or may be stored remotely and accessible to the device. System 10 may then, based on the touch input and the context of the item, provide touch responses at 714. System 10 generates a touch response, preferably in the form of a haptic effect, based on the context of the item at that level. The contextual database sends a haptic effect signal to a haptic output device, which in turn generates the haptic effect as a touch response. In addition to haptics, the touch response may include, visual, auditory, tactile, olfactory, or gustatory feedback, as appropriate.

As disclosed, an embodiment provides contextual haptic effects in response to pressure applied to a device. Pressure may be applied as a touch, a force, or a virtual touch or virtual force resulting in a virtual pressure. A force may be an impulse function in the sense that the force is applied at a specific point, such as with the use of a stylus or other peripheral, or a force provided over an area. Pressure may be applied directly to a touch-sensitive surface, to a housing of a device, or to a peripheral associated with a device. Pressure may be detected by interaction with a device or a section of the device such as a display screen, a touch pad, a deformable housing, or a peripheral device associated with the device (e.g., a stylus). The force applied to a device may be a normal force, a friction force, a tension force, a spring force, or an applied force, including a twisting force, a shear force, a stress, a strain, a projected force, a virtual force, etc. Contextual haptic effects may include a vibration, a force or pressure responsive to a particular interaction by the user, a puff of air, and other haptic responses, including variations based on magnitude, frequency, and other haptic parameters.

As disclosed, an embodiment provides a system which provides contextually-based haptic responses to a user to provide the user with additional information about selected items in response to user-supplied pressure. The pressure applied by the user may be in the form of at least a change in a force used by the user to interact with a system (actual pressure), a change in the amount of surface area the user interacts with during interactions with the system (pseudo pressure), or a gesture such as a distance traveled in a virtual space (virtual pressure). In particular, an embodiment allows a user of a device to scroll through a list or stack of items and be provided contextual haptic feedback about each item as each item is selected or passes through a selection region during scrolling. The contextual haptic feedback may be selected dependent on the pressure applied by the user. An embodiment also provides for a user of a virtual or augmented reality system to receive contextually-based haptic responses while moving through virtual objects or selecting one of a plurality of virtual objects. An embodiment in particular provides contextually-based haptic effects while the user is scrolling or moving along a z-axis relative to an actual or virtual display screen or plane.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer-implemented method of generating a contextual haptic effect, the method being performed by a haptically enabled device including a processor programmed with computer instructions that, when executed, cause the haptically enabled device to perform the method, the method comprising:

detecting a level of pressure input applied to a touch-sensitive surface of the haptically enabled device using a gesture, wherein the level of pressure input is based on at least one of a force applied with the gesture and a measured touch surface area of the gesture;

determining, by the processor, a selection of an interface level from among a plurality of interface levels of the haptically enabled device associated with the gesture based on the level of pressure input;

generating, by the processor, a primary haptic effect in response to the selection of the interface level;

outputting the primary haptic effect by a first actuator associated with the haptically enabled device;

determining, by the processor, display of an item at the interface level based on the gesture;

determining, by the processor, a context associated with the item at the interface level;

generating, by the processor, a contextual haptic effect in response to the display of the item according to haptic effect parameters based on the context of the item at the interface level; and outputting the contextual haptic effect by a second actuator associated with the haptically enabled device.

2. The method of claim 1, wherein the level of pressure input is based on the force applied with the gesture.

3. The method of claim 1, wherein the level of pressure input is based on the measured touch surface area of the gesture.

4. The method of claim 1, where the gesture is applied along a substantially perpendicular axis to the touch-sensitive surface.

5. The method of claim 1, wherein the interface level is represented on a display of the haptically enabled device in a depth direction.

6. The method of claim 1, wherein the contextual haptic effect is determined based on the gesture.

7. A non-transitory computer readable medium having instructions stored thereon that, when executed by a processor, cause the processor to perform a method of generating a contextual haptic effect, the method of generating comprising:

determining a level of pressure input applied to a touch-sensitive surface of a haptically enabled device using a gesture, wherein the level of pressure input is based on at least one of a force applied with the gesture and a measured touch surface area of the gesture;

determining, by the processor, a selection of an interface level from among a plurality of interface levels of the haptically enabled device associated with the gesture based on the level of pressure input; generating, by the processor, a primary haptic effect in response to the selection of the interface level;

outputting the primary haptic effect by a first actuator associated with the haptically enabled device;

determining, by the processor, a display of an item at the interface level based on the gesture;

determining, by the processor, a context associated with the item at the interface level;

generating, by the processor, a contextual haptic effect in response to the display of the item according to haptic effect parameters based on the context of the item at the interface level; and outputting the contextual haptic effect by a second actuator associated with the haptically enabled device.

8. The computer readable medium according to claim 7, wherein the method of generating further comprises determining the level of pressure input based on the force applied with the gesture.

9. The computer readable medium according to claim 7, wherein the method of generating further comprises determining the level of pressure input based on the measured touch surface area of the gesture.

10. The computer readable medium according to claim 7, wherein the method of generating further comprises determining the gesture based on application along an axis arranged substantially perpendicular to the touch-sensitive surface.

11. A system configured to generate a contextual haptic effect, the system comprising:
 a touch-sensitive surface;
 a haptic output device; and
 a controller coupled to the haptic output device;
 wherein the controller is configured to:
  detect a level of pressure input applied to the touch-sensitive surface using a gesture, wherein the level of pressure input is based on at least one of a force applied with the gesture and a measured touch surface area of the gesture;
  determine a selection of an interface level associated with the gesture based on the level of pressure input;
  generate a primary haptic effect in response to the selection of the interface level;
  determine a display of an item at the interface level based on the gesture;
  determine a context associated with the item at the interface level; and
  generate a contextual haptic effect in response to the display of the item according to haptic effect parameters based on the context of the item at the interface level.

12. The system according to claim 11, wherein the touch-sensitive surface comprises a two-dimensional surface.

13. The system according to claim 11, wherein the controller is further configured to detect the level of pressure input based on the force applied with the gesture.

14. The system according to claim 11, wherein the controller is further configured to detect the level of pressure input based on the measured touch surface area associated with the gesture.

15. The system according to claim 12, wherein the controller is further configured to detect the level of pressure input based on elements of the gesture applied along a substantially perpendicular axis to the two-dimensional surface.

16. The method of claim 1, wherein the item is a first item, and the context associated with the first item includes information about a second item different than the first item and related to the first item.

17. The computer readable medium according to claim 7, wherein the item is a first item, and the context associated with the first item includes information about a second item different than the first item and related to the first item.

18. The system according to claim 11, wherein the item is a first item, and the context associated with the first item includes information about a second item different than the first item and related to the first item.

* * * * *